United States Patent [19]

Cortellini et al.

[11] 4,408,277
[45] Oct. 4, 1983

[54] HOLOGRAPHIC IMAGER

[75] Inventors: Conrad Cortellini, Indianapolis, Ind.; Jeffrey S. Boone, Midland, Mich.; Richard D. Conard, Indianapolis, Ind.

[73] Assignee: Moorfeed Corporation, Indianapolis, Ind.

[21] Appl. No.: 175,652

[22] Filed: Aug. 6, 1980

[51] Int. Cl.³ .............................................. G06F 15/20
[52] U.S. Cl. ...................................... 364/300; 358/90; 382/41
[58] Field of Search ...................... 364/515, 300, 900; 358/2, 90; 350/3.6

[56] References Cited

U.S. PATENT DOCUMENTS

| T924,002 | 7/1974 | Loh et al. | 364/300 |
|---|---|---|---|
| T987,004 | 10/1979 | Feuer et al. | 364/300 |
| 3,444,316 | 5/1969 | Gerritsen | 358/90 |
| 3,518,367 | 6/1970 | Smith | 358/90 |
| 3,541,238 | 11/1970 | Enloe et al. | 358/90 |
| 3,544,711 | 12/1970 | DeBitetto | 358/90 |
| 3,548,093 | 12/1970 | Kock | 358/90 |
| 3,566,021 | 2/1971 | Jakes | 358/90 |
| 3,619,026 | 11/1971 | Cindrich | 350/3.5 |
| 3,688,281 | 8/1972 | Veith | 340/173 LM |
| 3,829,838 | 8/1974 | Lewis et al. | 364/900 X |
| 3,861,784 | 1/1975 | Torok | 350/162 R |
| 3,890,035 | 6/1975 | Takeda | 350/150 |
| 3,936,667 | 2/1976 | Loubal | 364/300 X |
| 3,949,235 | 4/1976 | Niyazaki et al. | 250/578 |
| 4,034,355 | 7/1977 | Carlsen | 340/173 |
| 4,109,996 | 8/1978 | Ersoy | 350/3.66 |

Primary Examiner—Edward J. Wise
Attorney, Agent, or Firm—Barnes & Thornburg

[57] ABSTRACT

A holographic apparatus uses electronically processed three-dimensional information about an object to produce a three-dimensional display of that object and its movement. A holographic screen has a plurality of angularly multiplexed holographic images which are selectively illuminated by a modulator and light source to produce the three-dimensional surface outline of the object to be seen. Color encoding and rapid sequential presentation of images gives the effect of a full-color, three-dimensional "television" in which movement of the object and both horizontal and vertical parallax can be provided.

2 Claims, 18 Drawing Figures

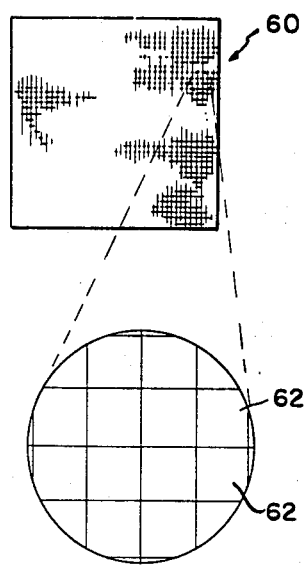
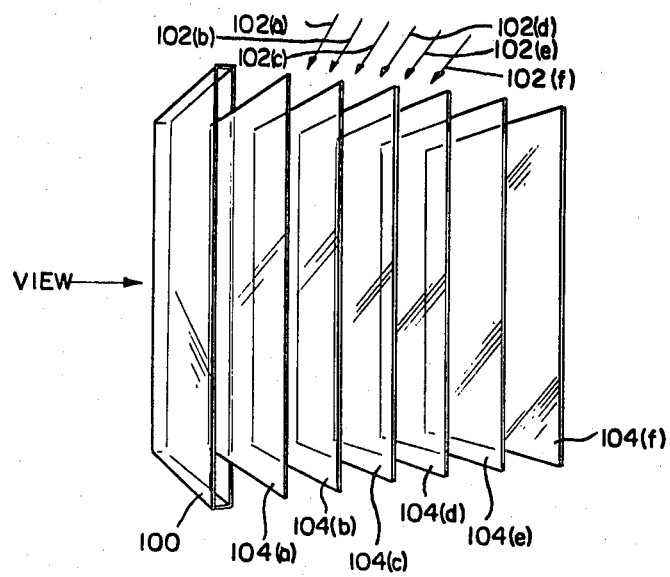
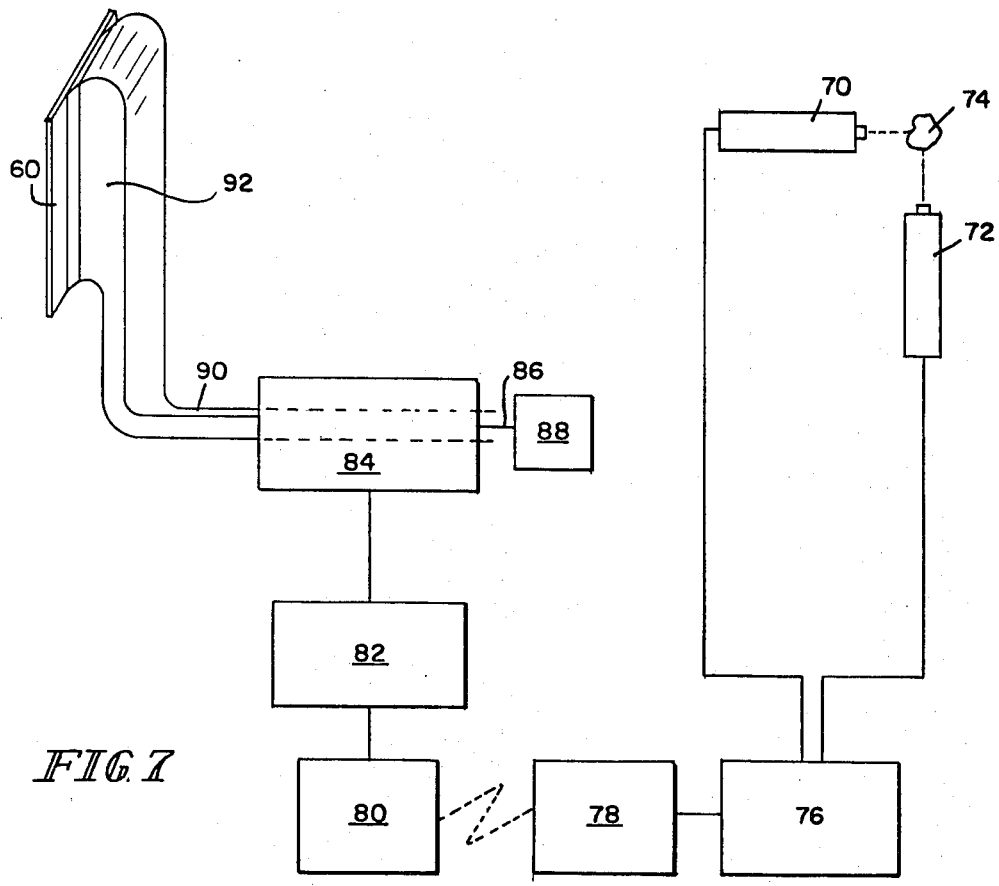

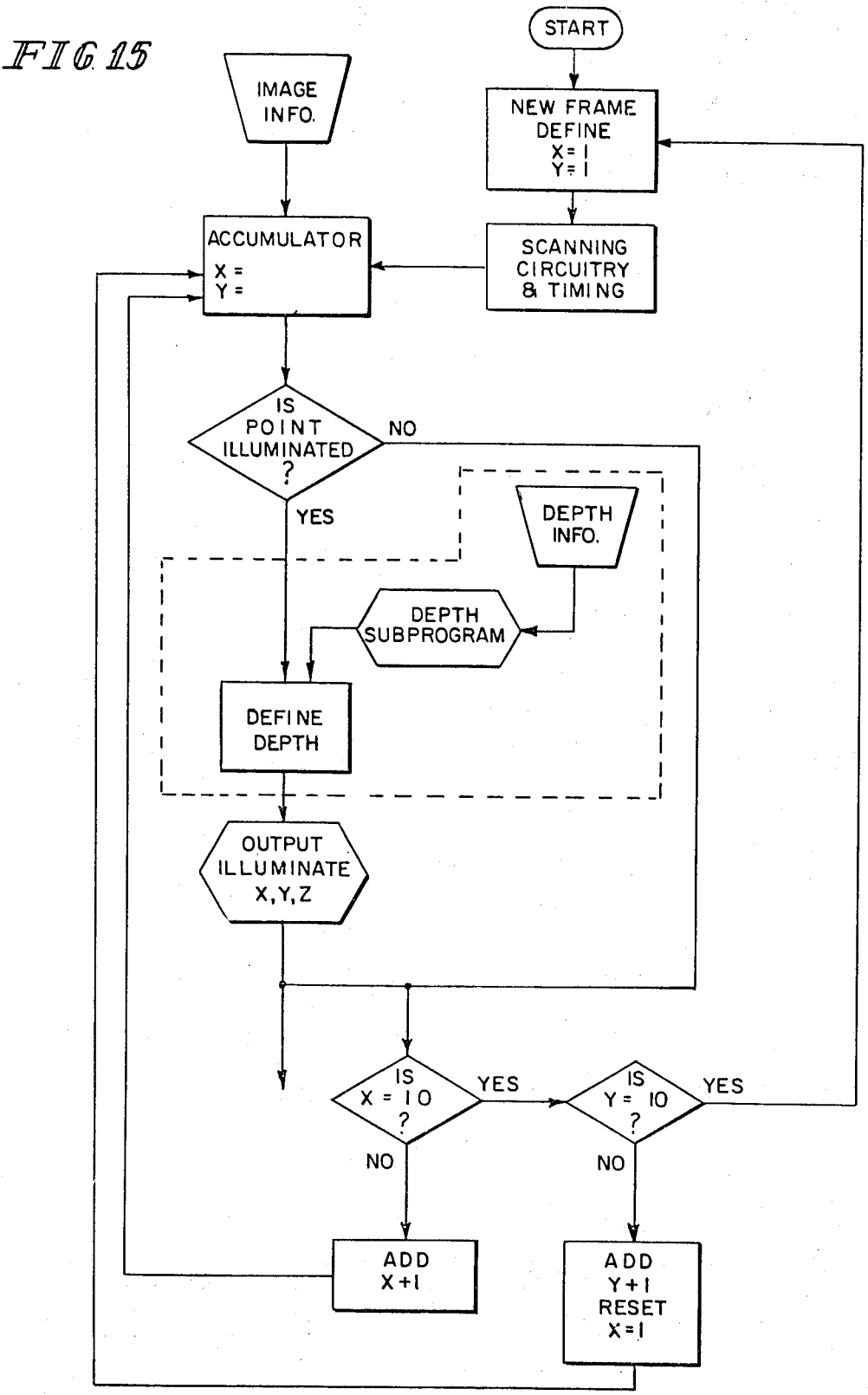

HOLOGRAPHIC IMAGER

Optical wave front reconstruction, or holography, is an interesting and useful technique for recording, storing, said viewing data and three-dimensional images. With respect to visual images, a particularly fascinating display would result if holographic images could be viewed in rapid sequence as a three-dimensional "movie" or "TV".

Several attempts have been made at producing a workable three-dimensional sequential image system. Relevant examples include the following:

Enloe et al., U.S. Pat. No. 3,541,238, uses an electron beam to etch a moving continuous loop thermoplastic film. A laser is then directed towards the film to reveal a series of holograhic images.

Kock, U.S. Pat. No. 3,548,093, activates a photochromic glass plate, focuses an image generated by a cathode ray tube upon the plate so as to bleach certain portions, and then reflects a coherent light source upon the plate.

DeBitetto, U.S. Pat. No. 3,544,711, teaches a method for encoding and viewing holographic TV signals. A modulator illuminates a semi-conductive layer, thus regulating the degree to which it reflects a coherent light source.

Smith, U.S. Pat. No. 3,518,367, constructs synthetic holograms from a description of the object to be seen.

Ersoy, U.S. Pat. No. 4,109,996, teaches a method for producing a synthetic hologram from a mathematical description of an object to be seen.

Carlsen, U.S. Pat. No. 4,034,355, teaches a method of holographic data storage and retrieval wherein each data list is recorded with a distinct angular relationship between interferring data and reference beams.

Miyazaki et al., U.S. Pat. No. 3,949,235, utilizes a plurality of miniholograms in coordination with a photo diode array for information retrieval.

Veith, U.S. Pat. No. 3,688,281, discloses a method of scanning a hologram matrix to retrieve stored information.

Torok, U.S. Pat. No. 3,861,784, uses a programmable diffraction grating to process an image optically.

Takeda, U.S. Pat. No. 3,890,035, teaches an apparatus for modulating the amplitude, phase, and polarization of an incident laser beam.

Gerritsen, U.S. Pat. No. 3,444,316, uses two X-ray originals to produce a visible hologram of the X-ray image.

Lewis et al., U.S. Pat. No. 3,829,838, combines two laser beams in a holograhic recording medium of either long or short persistence.

Jakes, U.S. Pat. No. 3,566,021, electronically records amplitude and phase information from each of several points in a moving scene. This information is applied to a display array which will transmit light on the basis of the stored phase and amplitude information.

Cindrich, U.S. Pat. No. 3,619,026, utilizes a two-dimensional array of holograms upon which particular images have been recorded. Each hologram has its own light source, and by selectively activating the light sources, the viewed scene may be made to change.

It seems, however, that each of these systems suffers from one or more inherent limitations or practical difficulties. Accordingly, this invention seeks to present a new, efficient, and practical method of sequentially presenting holographic images.

Briefly, the invention comprises: a holographic imager including a holographic screen having a plurality of hologram areas, each hologram area having a plurality of angularly multiplexed holograms; a light source, and a modulator for receiving an image signal and modulating said light source to illuminate particular hologram areas of said holographic screen at selected angles corresponding to selected ones of said angularly multiplexed holograms in response to the image signal.

The invention can best be understood by referring to the following detailed description and accompanying drawings which illustrate the invention. In the drawings:

FIG. 6 is a diagrammatic front elevational view of a holographic viewing screen and a portion thereof much enlarged;

FIG. 7 is a diagrammatic illustration of a holographic "television" imager system;

FIG. 8 is a diagrammatic exploded perspective view of a holographic screen and several of its layers of holographic emulsion, or viewing planes;

FIG. 15 is a flow chart for a program for processing input information from a system of the type illustrated in part in either of FIGS. 12-13 to generate an image signal;

Figure 1:
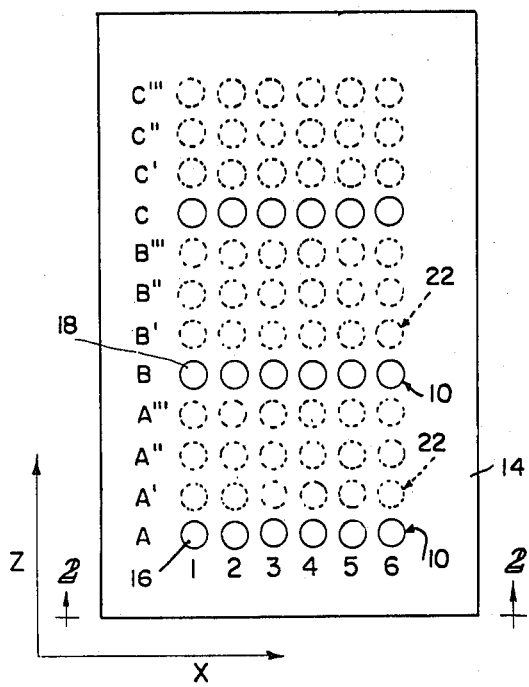
FIG. 1 is a diagrammatic top plan view of a dot matrix for use in recording a hologram.
Figure 2:
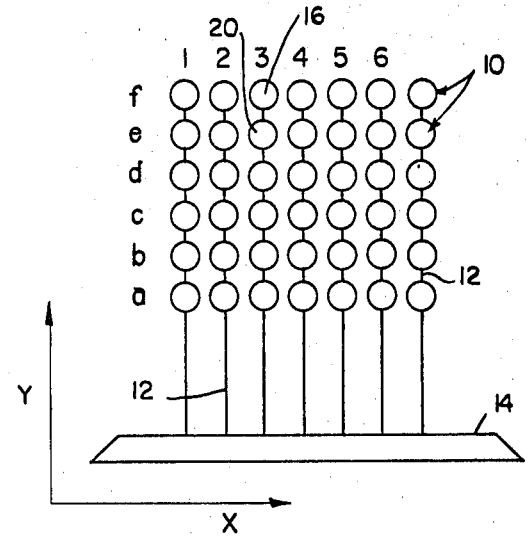
FIG. 2 is a diagrammatic front elevational view of the matrix of FIG. 1, taken generally along lines 2—2 thereof.

In a first embodiment of the invention, an illusion is created whereby an observer will see rows of dots appear to undergo movement. Turning now to FIGS. 1 and 2, a matrix of dots 10 is supported by a system of essentially invisible supports 12, such as thin stiff wires, above a base 14. The points of the resulting three-dimensional matrix are labelled according to a system whereby arabic numerals indicate positions along the X axis, lower case letters indicate positions along the Y axis, and capital letters indicate positions along the Z axis. The dots 10 in FIG. 1 all lie in a plane whose coordinates are 1-6 on the X axis, f on the Y axis, and A, B and C on the Z axis. The dots 10 in FIG. 2 lie in a plane whose coordinates are 1-6 on the X axis, a-f on the Y axis, and A on the Z axis. The row of dots indicated by A,1 through A,6 in FIG. 1 are the same dots indicated by f,1 through f,6 in FIG. 2. For instance, dot 16 whose coordinates are A,3 in FIG. 1 is the same dot 16 whose coordinates are f,3 in FIG. 2. Dot 18 of FIG. 1 is not seen in FIG. 2, but lies directly behind dot 16 in FIG. 2. Dot 20 of FIG. 2 is not seen in FIG. 1, but lies directly underneath dot 16 of FIG. 1.

In FIG. 1, it will be noted that the dot 10 spacings are substantially constant from left to right, but a much larger space, capable of accommodating three dots, exists between rows along the Z axis. As the matrix is moved backwards along the Z axis, dots 10 will take the positions indicated by the broken line dots 22. For example, if the matrix is moved back one increment along the Z axis, the dots in row A are moved to row A', those in row B are moved to row B' and so on.

Figure 3:
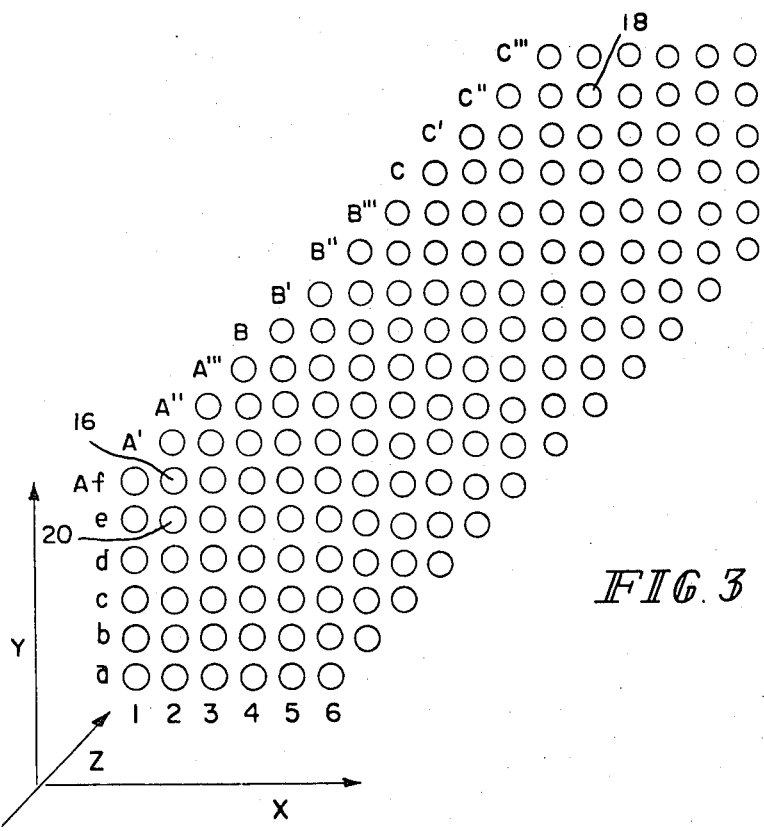
FIG. 3 is a diagrammatic perspective view of a solid three-dimensional dot array recorded in a hologram.
Figure 4:
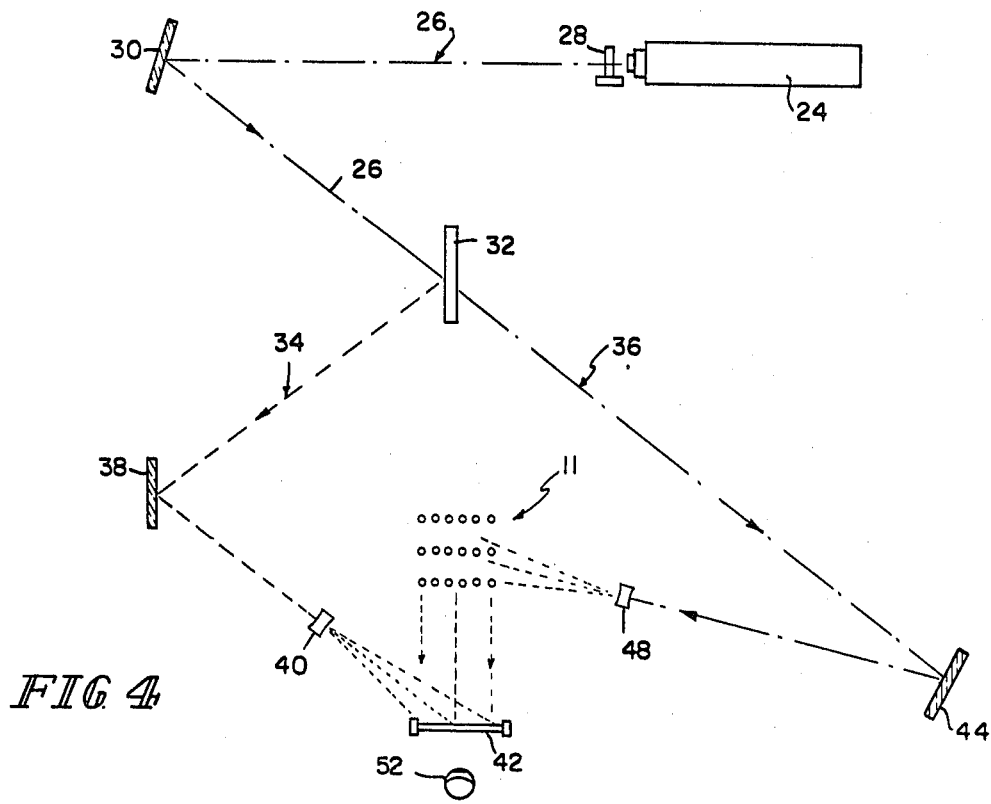
FIG. 4 is a diagrammatic top plan view of an apparatus for recording a transmission hologram of an object.

FIG. 3 illustrates a solid array of dots. A hologram of such a solid array of dots can be constructed from the dot matrix shown in FIGS. 1 and 2 as follows. FIG. 4 illustrates apparatus for constructing a hologram. A laser 24 provides a source of coherent light 26. A shutter 28 selectively permits the light to pass into a mirror and exposure system. Light beam 26 is first reflected from mirror 30 to a beam splitter 32 where it is split into a reference beam 34 and an object beam 36. Beam splitter 32 is so constructed that approximately 90% of the incident laser light 26 will be reflected as reference beam 34 and approximately 10% of the incident beam 26 will be transmitted as object beam 36. Reference beam 34 is reflected from mirror 38 to lens 40 which disperses beam 34 over the surface of holographic plate 42. Object beam 36 is reflected from mirror 44 and is diverged by lens 48 so as to be dispersed over the surfaces of the matrix 11. A portion of the object beam which is incident upon matrix 11 is reflected from the matrix to holographic plate 42. After exposure, the holographic plate 42 contains a hologram of matrix 11. This matrix includes all of the dots in positions A, B, and C along the Z axis, but would contain no dots in the positions represented by A', A", A"', B', etc. In order to expose a solid dot matrix upon holographic plate 42, matrix 11 will be moved one increment backwards along the Z axis, the plate will then be re-exposed, and the process repeated two more times. Thus, there will be exposures in planes perpendicular to the Z axis which are represented by A', A", A"', etc. If viewed, this multiply exposed hologram would show a solid dot matrix as is partially illustrated in FIG. 3.

Figure 5:
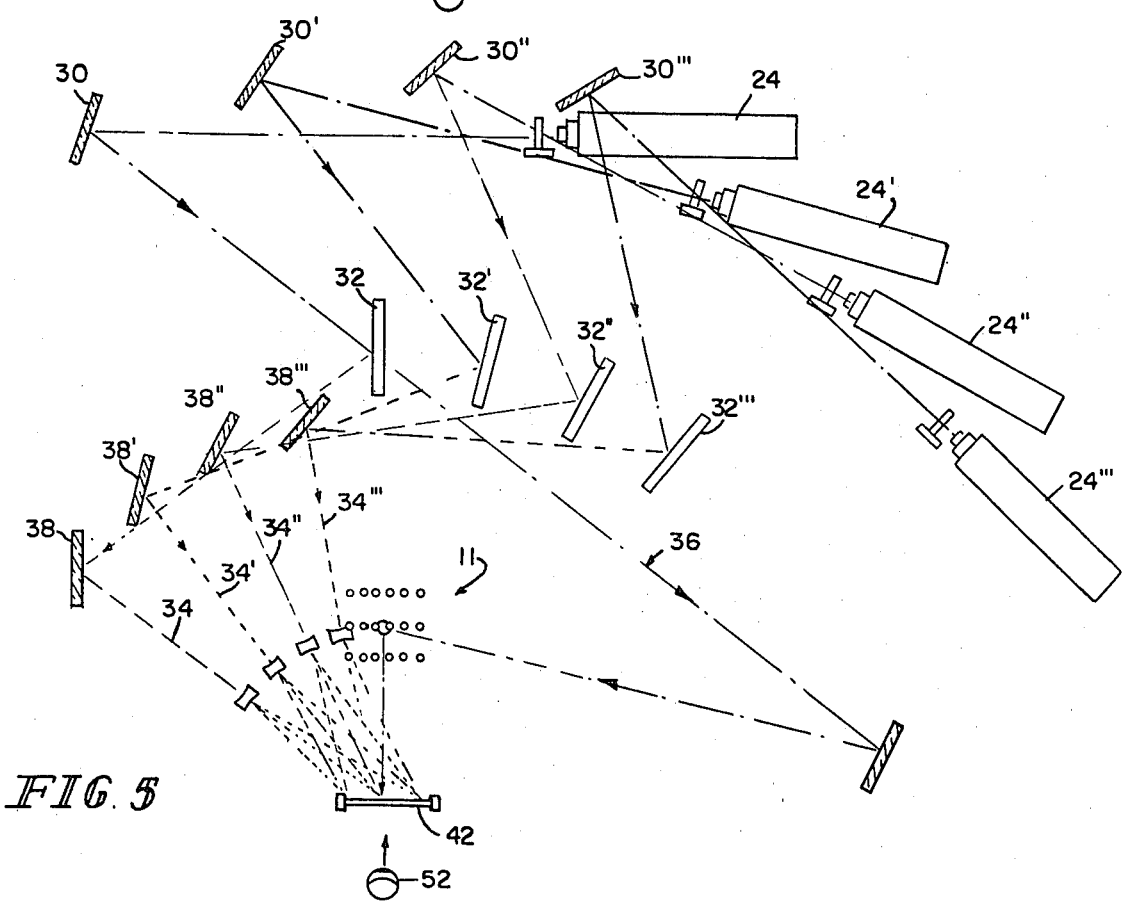
FIG. 5 is a diagrammatic top plan view of an apparatus for sequentially imaging a hologram.

A more interesting holograph can be created by varying the above process somewhat. FIG. 5 illustrates an expansion upon the apparatus of FIG. 4. In FIG. 5, those items identical with items of FIG. 4 are numbered identically, and those items differing only in position, are indicated with a prime ('). In FIG. 5, laser 24, mirror 30, and splitter 32 are used to provide reference beam 34 and object beam 36. Using only light from laser 24, matrix 11 is exposed. Matrix 11 is then moved one increment along the Z axis so that the dots which were in position A are now in the position A'. The holographic plate is now exposed a second time using the object beam 36 provided by laser 24, but using reference beam 34' which is provided from laser 24', mirror 30', and splitter 32'. Third and fourth exposures of plate 42 are made, each time with matrix 11 being moved back one increment further along the Z axis. The third and fourth exposures use reference beams 34" and 34"', respectively, but all exposures use object beam 36.

A viewer 52 who views the developed plate illuminated only by laser 24 will see only those dots in rows A, B, and C. If viewer 52 views the hologram with light only from laser 24', he will see only those dots in rows A', B', and C'. And, of course, if all four lasers are used for viewing the hologram 42, all twelve rows, A-C"' will be seen.

If lasers 24-24"' are each turned on and off in a rotating sequence, the dots 10 will appear to move. When laser 24 is on, the dots in planes A, B, and C will be seen. When laser 24 is turned off and laser 24' is turned on, the dots immediately behind those previously visible, i.e., those in A', B', and C' will be visible. The dots continue to appear to move backwards as laser 24' turns off and 24" turns on, and when laser 24" turns off and laser 24"' turns on. When laser 24"' turns off and laser 24 turns back on, the laser cycle is completed, but the dots continue to appear to move backwards. At this point, the dots in row A"' will appear to move to row B, and a new row of dots will appear in row A. Similarly, those dots in row B"' will appear to move to row C and those dots in row C"' will seem to disappear.

By merely altering the sequence in which the lasers turn on and off, the effect may be varied. For instance, if the lasers turn on and off starting with laser 24"' and moving to laser 24, the dots will appear to come from infinity and disappear in the nearest plane. If the on-off sequence travels back and forth between laser 24 and laser 24"', the dots will appear to oscillate back and forth.

The exposure and viewing arrangement of FIG. 5 is only one of many possible arrangements that will achieve the same effect. In particular, when holographic plate 42 is exposed, only a single stationary laser need be provided. The angle of incidence of the reference beam 34 may be varied by moving mirror 38. Further, for viewing the developed holographic plate, a laser is not needed at all. Instead, four focused non-coherent light sources may be used, if the screen is constructed from a series of so-called "rainbow" holograms. These "rainbow" holograms have an inherent characteristic that they diffract and scatter the image light, resulting in an image which displays unrealistic spectral colors. This, of course, may be undesirable for certain applications.

In a second embodiment of the invention, a three-dimensional "television" is produced. In FIG. 6, a holographic screen 60 is comprised of a plurality of discrete hologram areas 62. Each area 62 has been separately exposed and contains holograms of dots in a plurality of positions along a line which is perpendicular to screen 60. Specifically, all of the dots recorded within a single area appear at an X, Y coordinate which corresponds to the location of the area itself. But within each area the individual dots appear at different locations along the Z axis. Each of these dots has been separately exposed and the angle of the reference beam was different for each dot.

Thus, by selectively illuminating a particular area 62 and appropriately adjusting the angle of incidence of the light, any single dot within a three-dimensional matrix can be viewed. By moving the light left and right along the X axis, the dot will appear to move left and right along the X axis. If the light is moved up and down along the Y axis, again, the dot will appear to move up and down along the Y axis. To get the dot to move back and forth along the Z axis, the angle of incidence of the light is changed, while maintaining the light on a single area 62. If the movements of the light are coordinated, a single dot can be made to travel at any speed in any direction within the three-dimensional matrix.

If selected dots are chosen to be illuminated and the scanning rate is increased, the viewer will no longer see an individual dot moving, but rather will see a stationary object comprised of the individual dots. If a rapid scanning rate is maintained, but the particular dots which are illuminated are slowly changed to other dots, the object will appear to move to the location of the newly illuminated dots. For instance, if a spoon is to be viewed by an observer, those dots representing the outside surface of the spoon will be illuminated. As the viewer raises his head, he will see more of the dots on the top surface of the spoon, and as he lowers his head, he will see more of the dots on the bottom of the spoon. There is no need to illuminate new dots when the viewer moves his head. They are all illuminated when the spoon is initially shown, but the viewer can see only a limited number of dots at any one time. By moving his head, the viewer can see dots which were previously hidden by other dots, thus giving horizontal and vertical parallax to the view. It must be noted that, since images are constructed from selectively illuminated dots, there is a possibility, depending upon the image signal-processing system, that distant light objects of a scene might be visible through dark objects in the foreground. It should be noted that this characteristic may be desirable in an X-ray application, although it would present a difficulty in a television application.

In actual practice, a viewing screen 60 must be composed of a sufficiently large number of individual holograph areas 62 to give a resolution which is suitable for the intended purpose of the apparatus. For some low resolution applications, a screen of from fifty to one hundred areas wide and tall may be sufficient, but for high-resolution capability, a width and height of from five to six hundred would be preferable. The resolution of discrete points which may be viewed in the Z axis is limited by several factors. The apparatus which focuses the light upon screen 60 must be capable of accurately focusing the light at a number of different angles. Resolution along the Z axis is limited by the number of specific angles at which the apparatus is able to focus light. Resolution along the Z axis is also limited by the ability of the hologram to store distinct dots using angular multiplexing. The resolution capability of the film increases as the thickness of the photographic emulsion is increased. A third factor is the degree to which resolution along the Z axis is required. If such resolution is limited, the quality of the two-dimensional image will not be affected, only the three-dimensional image's third dimension, or depth perception, will be limited.

FIG. 7 shows a block diagram of a "television" application of the invention. Cameras 70 and 72 are conventional vidicon cameras which are focused upon object 74. The signals from these cameras are analyzed by computer 76 and converted into a usable digital form. Blocks 78, 80 represent a transmission and receiving link. These could be a tape recorder and player, broadcast transmitter and receiver, or any other form of data transmission and reception apparatus. If the picture is desired to be seen immediately, transmitter 78 and receiver 80 may be eliminated completely. Computer 82 processes the digital information into a usable form, i.e., height, depth, width, and intensity of points to be illuminated. This information is sent to modulator 84 which controls the output 86 of laser 88. This modulated laser output is fed to optical fiber bundle 90 which supplies light to optical fiber mat 92. Optical fiber mat 92 lies behind and illuminates holographic screen 60. Modulator 84 regulates which optical fibers will be illuminated, with what intensity they will be illuminated, and at what angle they will be illuminated. This information is transmitted by the fiber to the optical mat where the light strikes the holographic viewing screen 60.

Importantly, the diagrammatic view of FIG. 7 is only illustrative of one of many possible arrangements. A single camera may be used if sufficient three-dimensional information may be fed to computer 76, or more than two cameras may be used if a great deal of three-dimensional information is desired. If two cameras are used and are placed at the same height, the viewer will experience only horizontal parallax. However, if a third camera is placed in a plane above or below that of the other two cameras, additional information may be sent to computer 76 which can process a picture which will have both horizontal and vertical parallax. Further, the input of computer 76 need not be that of a camera. This system can be adapted to create images from such media as X-ray, sonar, infrared, and any other medium capable of generating an information-containing signal from which the information can be retrieved for spatial display. The input to computer 76 can be manually controlled, permitting one to create original designs on holographic screen 60.

The laser 88, modulator 84, and fiber optics mat 92 are only one possible method of illuminating holographic screen 60. Any light source, whether coherent or non-coherent, can be used, subject to the above-noted considerations regarding "rainbow" holograms. Any device which is capable of accurately and rapidly focusing light upon the screen at the proper location, intensity, and angle can be suitable.

Mirror or lens systems can be usable. This system is adaptable to be used in the presentation of color images. For color images, three light sources, red, blue, and green, or a single white light source with three color filters, are needed. The three colors of light could separately or simultaneously scan the screen to produce an essentially full-color image in a color mixing manner similar to that of conventional television.

Having already described several alternative approaches to producing three-dimensional images, FIG. 8 will serve as a starting point for describing a more highly refined embodiment. Turning now to FIG. 8, it will be recalled that an object of the invention is to have a viewing device 100 which causes images to appear in several planes 104 (*a–f*). Planes 104 (*a–f*) are selectively accessed by controlling the angle of the incident light waves 102 (*a–f*) on viewing device 100. Each wave 102 (*a–f*) is at a slightly different angle to illuminate a respective plane 104 (*a–f*).

Figure 9:
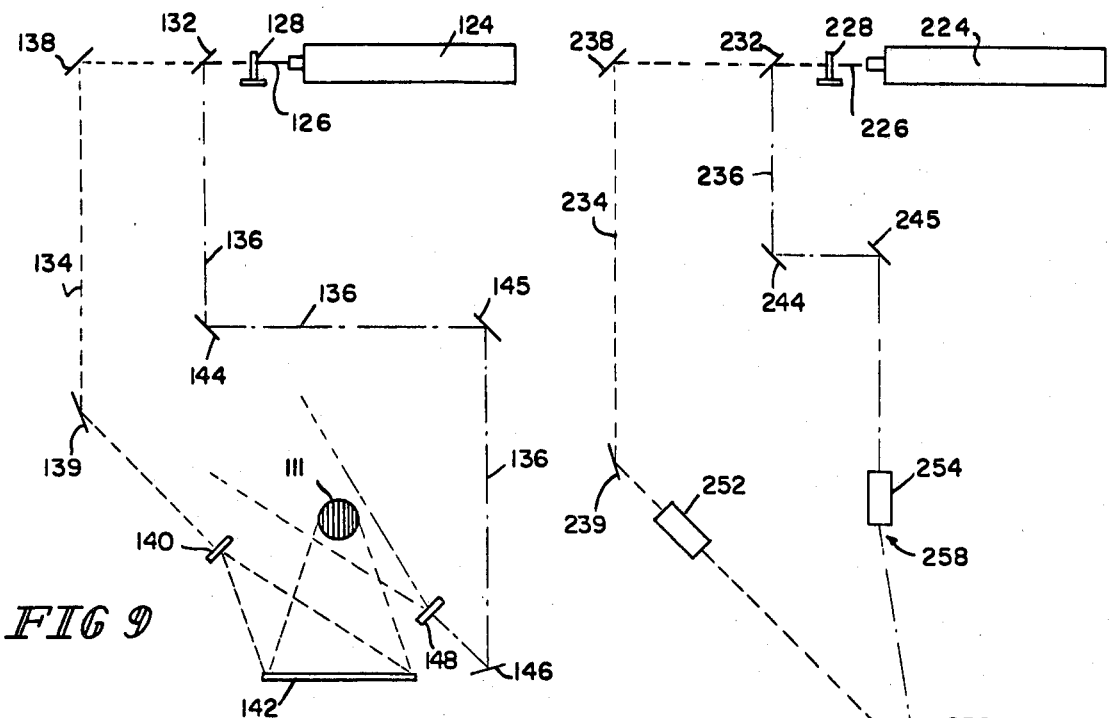
FIG. 9 is a diagrammatic top plan view of a holographic camera system according to the invention.

Referring now to FIG. 9, a holographic "camera" system is shown diagrammatically. This camera is similar to that in the embodiment of FIG. 4. In FIG. 9, a laser 124 directs a laser beam 126 through a shutter 128. A beam splitter 132 splits laser beam 126 into a reference beam 134 and object beam 136. Although not illustrated in FIG. 9 for convenience, it is understood that path lengths of the reference and object beams 132, 134, respectively, must be substantially equal. Mirrors 138, 139 reflect reference beam 134 to diverging lens 140 and subsequently to plate 142. Mirrors 144, 145, 146 reflect object beam 136 to diverging lens 148 and object 111. The exposure and viewing of plate 142 is accomplished by a process such as that explained in reference to FIG. 4. At this point, it is important to understand that plate 142 is recording interference patterns produced by the interaction of the reference beam from diverging lens 140 and the object beam reflection from object 111. It is this interference pattern which is stored as data and used to reconstruct an image of object 111.

Figure 10:
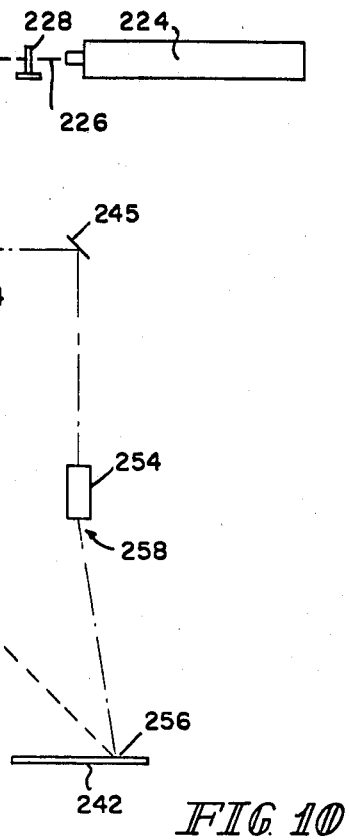
FIG. 10 is a diagrammatic top plan view of a holographic camera system according to the invention.

Turning now to FIG. 10, an alternative holographic camera system is presented. In this camera system, there is no "object," as such. Instead, reference beam 234 and object beam 236 combine directly to form an image on the holographic emulsion on plate 242. Specifically, reference beam 234 passes through a scanner 252 before reaching plate 242. Similarly, object beam 236 passes through a scanner 254. Scanners 252, 254 are devices which aim their respective beams 234, 236 onto specific points of the holographic plate 242. The specific means employed by scanners 252, 254 is unimportant, so long as the end result is reached. Possible embodiments of scanners 252, 254 include deflection mirrors which rotate about multiple axes, fiber optics, and electromagnetic aiming devices.

If holographic plate 242 is exposed in accordance with the configuration illustrated in FIG. 10, a single holographic point 256 will be exposed. When viewed by an observer, this exposed point will appear to be positioned at the output 258 of scanner 254. If all of the equipment of FIG. 10 remains in its relative position, illustrated, and other points on plate 254 are exposed, a two-dimensional matrix of points will be formed. This two-dimensional matrix of points will appear in a single plane which is parallel to plate 242 and which is positioned at the output 258 of scanner 254. Upon viewing this exposed plate, any one or all of the points in the plane may be viewed by the appropriate focusing of scanner 252.

Figure 11:
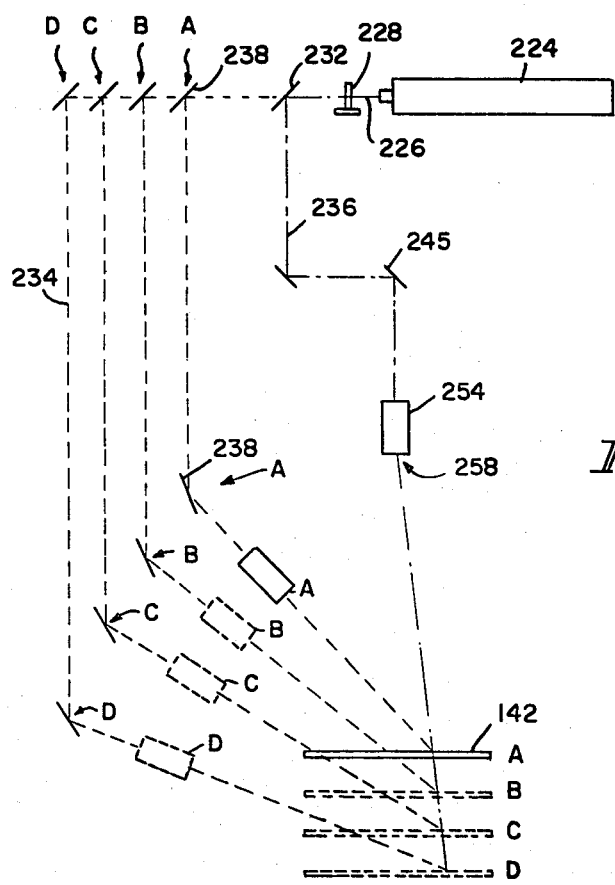
FIG. 11 is a diagrammatic top plan view of a multiple plane arrangement of the camera system of FIG. 10.

Referring now to FIG. 11, mirrors 238, 239, scanner 252, and holographic plate 242 are shown in their original positions A (as illustrated in FIG. 10), and in subsequent broken-line positions B-D. These additional broken-line positions indicate subsequent exposures of plate 242 in different planes. When the equipment is moved from position A to position B, and a point at the same physical location on plate 242 is exposed, the angle between reference beam 234 and object beam 236 is changed. Additionally, the physical distance between plate 242 and output 258 of scanner 254 is increased. The relationships are similarly changed when the equipment is moved to positions C and D. If a complete plane of points is exposed when the equipment is in each of positions A-D, then the completed holographic plate 242 will contain four angularly multiplexed planes of points which will appear to be at different physical distances from the observer. This plate may now be selectively illuminated by a reference beam to produce an image with a depth resolution of four points.

Exposure without an "object" as illustrated in FIGS. 10 and 11 has several advantages over the method illustrated in FIGS. 4 and 5. The principal advantage is that with the embodiment of FIGS. 10 and 11 one is not limited by the physical characteristics of the "objects." By controlling the beam diameter and intensity, special purpose and custom order holographic plates can be easily prepared. Such a system is easily adaptable to automated control and production.

Importantly, many modifications of the plate exposure method are possible. Again, the importance is the end result of an exposed plate containing multiple planes of points, rather than the method by which this exposure is obtained. Additionally, entirely different methods such as exposure through a perforated screen, are possible.

Figure 12:
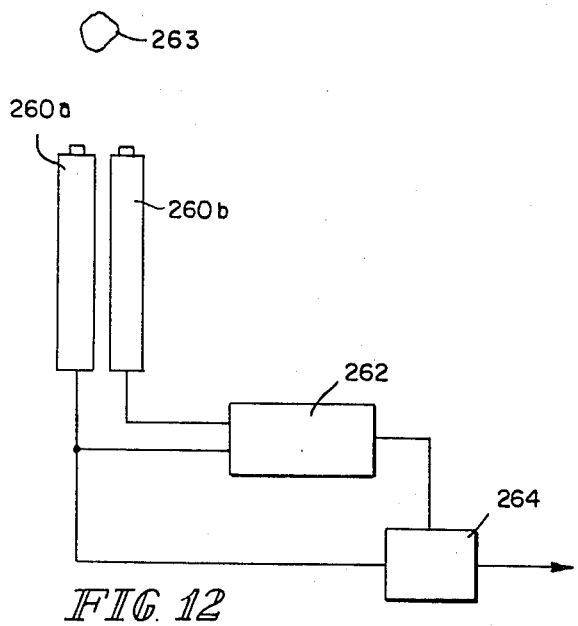
FIG. 12 is a diagrammatic top plan view of a two-camera image processing system.
Figure 13:
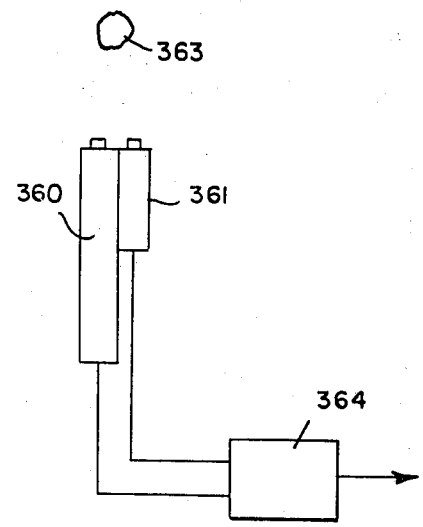
FIG. 13 is a diagrammatic top plan view of a camera-radar image processing system.

FIGS. 12 and 13 will serve as a basis for explaining two methods of electronically processing image information for playback on a holographic imager. In FIG. 12, two cameras 260a, 260b process image information from an object 263 in a manner similar to that of ordinary vidicon (television) cameras. As cameras 260a, 260b are in physically different positions, each will see a slightly different image. A comparator circuit 262 evaluates the difference between the two images and generates a depth signal from the comparison. Processor 264 processes the image from camera 260a in accordance with the depth signal from comparator 262 to provide a three-dimensionally encoded image signal. In FIG. 13, a camera 360 receives image information reflected from object 363 and a radar device 361 provides depth information about object 363. Processor 364 processes the signal from camera 360 in accordance with the depth information provided from radar device 361, to produce a three-dimensionally encoded image signal.

The particular hardware utilized in the operation of comparator 262 and processors 264, 364 is not important to an understanding of this invention, but several generalized modes of operation will be explained. It will be appreciated that the output of the apparatus of FIG. 12 is similar to the output of the apparatus of FIG. 13. Both apparatus convey information relating both to certain two-dimensional aspects of the image and to certain aspects of the depth of the image. This combined output signal can be utilized in at least two different ways.

Figure 14:
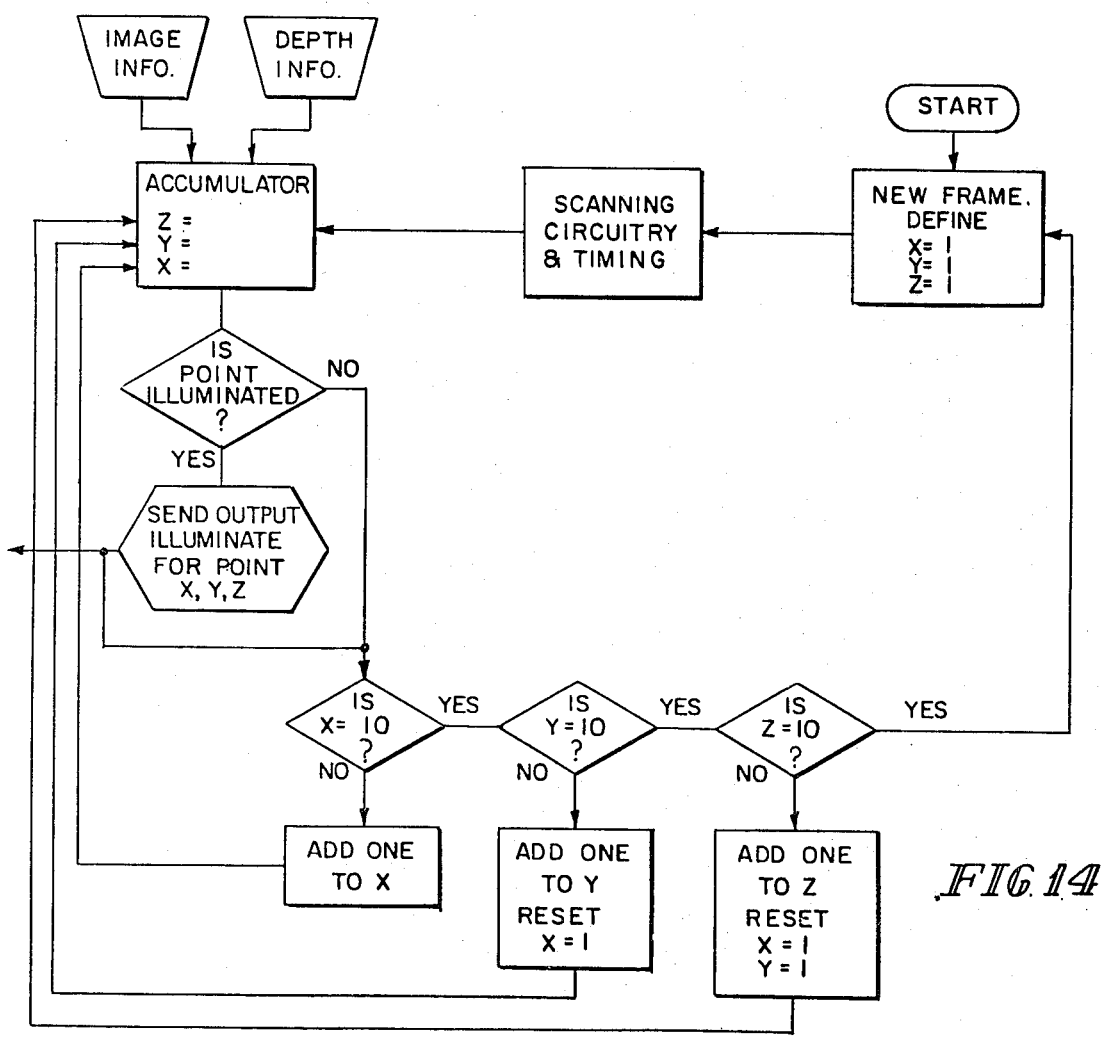
FIG. 14 is a flow chart for a program for processing input information from a system of the type illustrated in part in either of FIGS. 12-13 to generate an image signal.

A first method of utilization is illustrated by the flow chart in FIG. 14. The flow chart of FIG. 14 assumes an image-processing system having a resolution of ten points (numbered 1-10) in each dimension. When the program is begun, a new frame will be defined where the point $X=1$, $Y=1$, and $Z=1$ is analyzed. Scanning and timing clock circuitry coordinates the system and defines the scan rate. Image and depth information are provided to an accumulator which keeps track of which point is being analyzed. If the point under consideration is to be illuminated, based upon the camera 260a, 360, or image, input (see FIGS. 12-13), an "illuminate" output signal will be generated. If not, no "illuminate" output signal will be generated. In any event, the system will then advance.

Assuming that the system started at point 1,1,1, the next point to be analyzed will be point 2,1,1. The next will be point 3,1,1, and so on through point 10,1,1. After point 10,1,1 is analyzed, the "is $Y=10$?" decision block will cause point 2,1,1 to be the next point to be analyzed. The "is $X=10$?" decision block will next cause point 2,2,1 to be analyzed and so on through point 2,10,1. After 2,10,1 is analyzed, the system will proceed in stepwise fashion to 3,1,1 and so on. After point 10,10,1 (the last point in the first X-Y plane) is analyzed, point 1,1,2 (the first point in the second X-Y plane) will be analyzed. After analysis of point 10,10,10 (the last point in the last X-Y plane), a new frame will be input from a suitable buffer in the "image information" input to the accummulator and the process repeated. This method is a multi-scan method which analyzes the image several times, one scan for each plane.

Another method, best illustrated by FIG. 15, utilizes a single scan which analyzes depth for each two-dimensional point. That is, the system interrogates the input information for both two-dimensional information and depth on a point-by-point basis rather than a plane at a time. In the flow chart of FIG. 15, when the program is begun, a new frame is begun with coordinates X=1, Y=1. At this point, Z is not defined. If there is illumination at point 1,1, the system will then decide the Z coordinate of that point. When the Z coordinate is defined, an appropriate output signal will be generated. Whether or not there is illumination at 1,1, the system will then advance to point 2,1. As with the flow chart of FIG. 14, after point 10,1 is analyzed, point 1,2 will be analyzed. In contrast, however, after point 10,10 is analyzed, the system will have defined a complete "picture" (in three dimensions), and so a new frame with coordinates 1,1 will be started. The essential difference between these two systems is that in FIG. 14, multiple scans of the image are taken, with each scan being an analysis of a separate plane. In the method of FIG. 15, a single scan of the image is taken with the Z coordinate being defined for each X,Y coordinate only as that X,Y coordinate is reached.

Figure 15A:
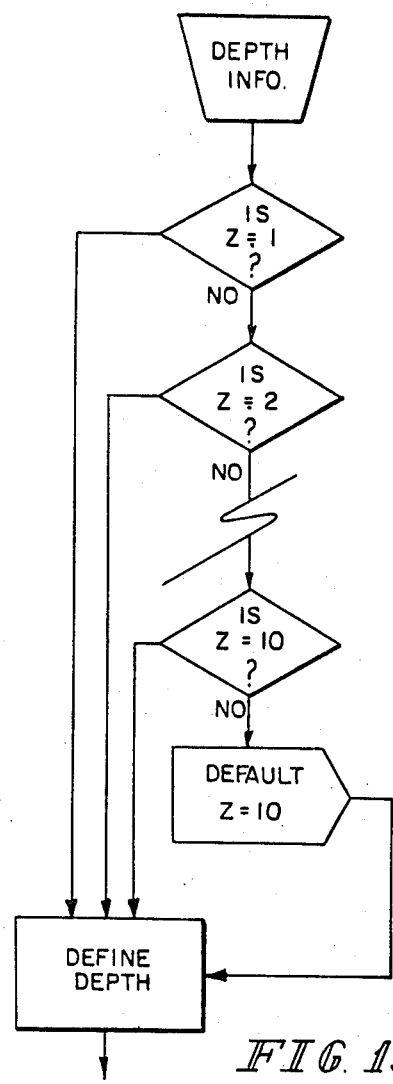
FIG. 15a is a flow chart for a subprogram of the program of FIG. 15.

In the system of FIG. 15, depending upon the processing method used, the process of defining the depth (Z) for a particular X,Y coordinate can be a more or less complex problem. If the depth signal is directly readable, it can simply be connected to the other circuitry and utilized. However, if the signal is not directly readable, a subprocess such as that of FIG. 15a can be used. The flow chart of FIG. 15a is of a multiple yes/no decision process subprogram to ascertain a depth value. This subprogram can be used, for example, in the region of the program flowcharted in FIG. 15 lying within broken lines. Since the system has already determined that a point is illuminated, if the depth (Z value) finding process does not establish a depth for the illuminated point, a "default Z = 10" is provided to the system. This is an arbitrary assignment of a "10" value to the Z parameter to put the illuminated point a maximum depth, or in the "background."

Whether a single or multiple scan system is used, a further modification is possible. If additional analysis circuitry and sufficient buffer space are provided, scanning for the second frame may begin before scanning of the first frame is completed. This overlapping scan is extremely important if the scanning hardware has a relatively slow rate. For instance, if the scanning hardware scans so slowly that the human eye will detect separate frames rather than continuous motion, overlapping scanning is necessary to increase the frame presentation rate.

Figure 16:
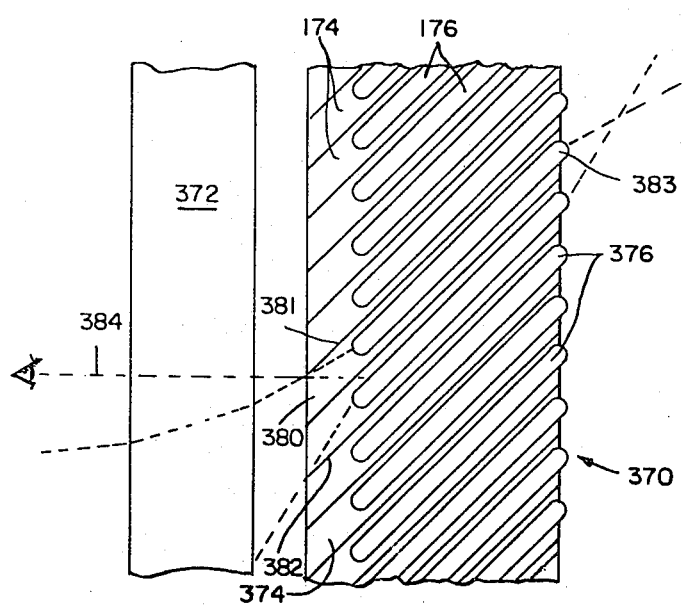
FIG. 16 is a diagrammatic sectional side elevational view of a fiber optic grid screen.

Referring now to FIG. 16, another embodiment for a holographic "viewing screen" is presented. A holographic emulsion plate 372 is placed in front of a grid system 370. Grid system 370 is comprised of a plurality of cells 374, each housing an optical fiber 376. This grid system is important inasmuch as a viewer looking through the semi-transparent holographic emulsion 372 would otherwise see the illumination and other apparatus behind the emulsion. However, the grid system effectively blocks the view of the illumination equipment while providing access for the illumination of the holographic emulsion 372. A particular cell 380 in grid system 370 has a top wall 381 and a bottom wall 382. The cell 380 houses a single optical fiber 383. A viewer looking horizontally along line 384 has a line of sight which passes just under the lower edge of upper wall 381. The viewer, however, will not be able to see optical fiber 383, but rather will see the surface of lower wall 382. Grid system 370 is illustratively opaque and darkly colored, thus creating a high contrast background.

The ends of optical fibers 376 which are remote from holographic emulsion 372 may be carried in bundles to a light-modulating source. The advantage of a system using fiber optics in this manner is that the light source can be placed a considerable distance from the screen.

Figure 17:
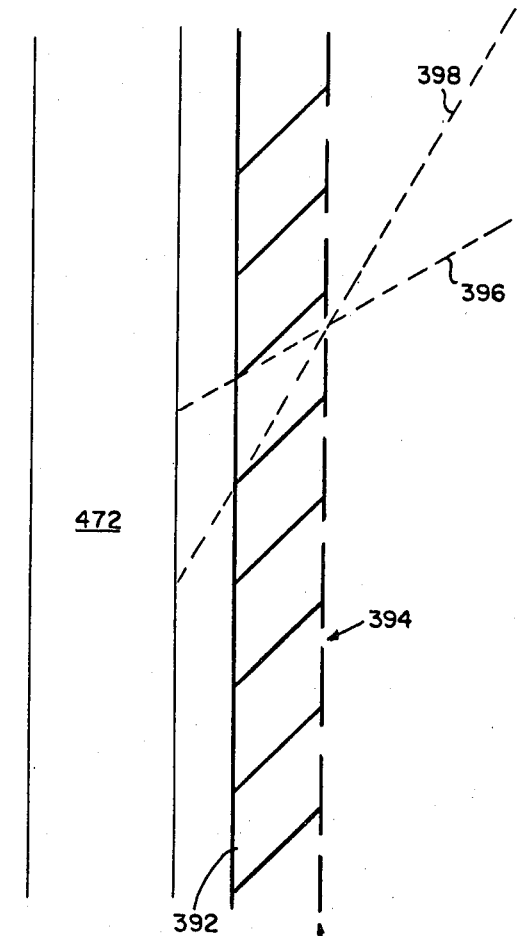
FIG. 17 is a diagrammatic sectional side elevational view of a grid screen.

Referring now to FIG. 17, a grid system 390 is located behind a holographic emulsion 472. Grid system 390 has a plurality of cells 392. Each cell 392 has a small opening 394 at its end remote from holographic emulsion 472. In this system, light being used to illuminate holographic emulsion 462 is passed through openings 394 at an angle between the angles of light rays illustrated by broken lines 396, 398, through cells 392, to emulsion 472. As with the embodiment of FIG. 16, a viewer looking horizontally along line 400 into the grid system will not be able to see the illumination equipment behind grid 390.

What is claimed is:

1. A method of decoding three-dimensional information addressable by three coordinates, comprising the steps of
    (a) defining an origin point;
    (b) analyzing the information content of the point and providing a corresponding output;
    (c) determining whether the last point analyzed is the last point along a first coordinate axis; if not, advancing to the next point along the first coordinate axis and returning to step b; if so, advancing to step d;
    (d) determining whether the last point analyzed is the last point along a second coordinate axis perpendicular to the first; if not, advancing to the next point along the second coordinate axis, returning to the origin point along the first coordinate axis, and returning to step b; if so, advancing to step e; and
    (e) determining whether the last point analyzed is the last point along a third coordinate axis perpendicular to the first and second coordinate axes; if not, advancing to the next point along the third coordinate axis, returning to the origin points along the first and second coordinate axes, and returning to step b; if so, returning to step a.

2. A method of decoding three-dimensional information addressable by three coordinates, comprising
    (a) defining an origin line perpendicular to and at the intersection of a first coordinate axis and a second coordinate axis;
    (b) analyzing the information content of the line, determining the position of the information along the first coordinate axis, and generating a corresponding output signal;
    (c) determining whether the last line of information analyzed is at the last point along the first coordinate axis; if not, advancing to the next point along the first coordinate axis and returning to step b; if so, advancing to step d; and
    (d) determining whether the last line analyzed is at the last point along the second coordinate axis; if not, advancing to the next point along the second coordinate axis, returning to the first point along the first coordinate axis, and returning to step b; if so, returning to step a.

* * * * *